US008732783B2

(12) United States Patent
Kwak et al.

(10) Patent No.: US 8,732,783 B2
(45) Date of Patent: May 20, 2014

(54) APPARATUS AND METHOD FOR PROVIDING ADDITIONAL INFORMATION USING EXTENSION SUBTITLES FILE

(75) Inventors: Ki-won Kwak, Seongnam-si (KR); Chun-un Kang, Seoul (KR); Min-woo Jung, Seoul (KR); Chang-nam Chu, Yongin-si (KR); Jae-sung Park, Seoul (KR); Dae-hyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 11/398,635

(22) Filed: Apr. 6, 2006

(65) Prior Publication Data
US 2006/0272000 A1 Nov. 30, 2006

(30) Foreign Application Priority Data
May 26, 2005 (KR) .................. 10-2005-0044595

(51) Int. Cl.
*H04N 7/16* (2011.01)
(52) U.S. Cl.
USPC ............ 725/135; 725/136; 725/139; 725/151
(58) Field of Classification Search
None
See application file for complete search history.

(56) References Cited

U.S. PATENT DOCUMENTS

| 5,486,872 | A  | * | 1/1996 | Moon ............................ 348/564 |
| 5,774,666 | A  | * | 6/1998 | Portuesi ........................ 725/110 |
| 6,513,160 | B2 | * | 1/2003 | Dureau ............................. 725/9 |
| 6,741,242 | B1 | * | 5/2004 | Itoh et al. ...................... 345/419 |
| 6,931,656 | B1 | * | 8/2005 | Eshelman et al. ............... 725/37 |
| 7,426,467 | B2 | * | 9/2008 | Nashida et al. ................ 704/275 |
| 7,486,969 | B2 | * | 2/2009 | Anzawa et al. ................. 455/563 |
| 7,502,022 | B2 | * | 3/2009 | Ageishi et al. ................. 345/214 |
| 2003/0131357 | A1 | * | 7/2003 | Kim ................................ 725/60 |
| 2003/0190148 | A1 | * | 10/2003 | Lee ................................ 386/70 |
| 2005/0078221 | A1 | * | 4/2005 | Kobayashi .................... 348/600 |
| 2005/0213666 | A1 | * | 9/2005 | Kaneko et al. ............ 375/240.26 |

FOREIGN PATENT DOCUMENTS

| CN | 1447596 A | 10/2003 |
| JP | 2000-341228 A | 12/2000 |
| JP | 2001-350746 A | 12/2001 |
| JP | 2003-067099 A | 3/2003 |

(Continued)

OTHER PUBLICATIONS

Microsoft Corporation: "Understanding Sami 1.0" http://msdn2.microsoft.com/en-us/library/ms971327(d=printer).aspx.

(Continued)

*Primary Examiner* — Oschta Montoya
(74) *Attorney, Agent, or Firm* — Sughrue Mion, PLLC

(57) ABSTRACT

Disclosed are an apparatus for providing additional information by using an extension subtitle file including an inverse multiplexing unit to separate video and audio data from a multimedia file input by a data input unit, an XML parser to parse a caption data file and an additional information data file input by the data input unit, video and audio data processing units to decode the video and audio data input by the inverse multiplexing unit, and convert the decoded video and audio data into predetermined video and audio signals, a caption processing unit to process the caption data parsed and input by the XML parser, an additional information data processing unit to process the additional information data file parsed and input by the XML parser, and to generate user interface information based on the processed additional information, and a data output unit to display the processed video, audio, caption and user interface information.

18 Claims, 6 Drawing Sheets

(56) References Cited

FOREIGN PATENT DOCUMENTS

| | | |
|---|---|---|
| JP | 2005-124169 A | 5/2005 |
| KR | 10-2004-0033766 A | 4/2004 |
| KR | 10-2004-0108726 A | 12/2004 |
| WO | 03075175 A2 | 9/2003 |
| WO | 2005010882 A1 | 2/2005 |
| WO | 2005034122 A1 | 4/2005 |
| WO | 2005036550 A1 | 4/2005 |

OTHER PUBLICATIONS

"Digital Video Broadcasting (DVB); Subtitling systems; Final Draft ETSI En 300 743" ETSI Standards, Lls, Sophia Antipolis Cedex, France, vol. BC, No. V1.2.1, Jun. 1, 2002.

\* cited by examiner

APPARATUS AND METHOD FOR PROVIDING ADDITIONAL INFORMATION USING EXTENSION SUBTITLES FILE

CROSS-REFERENCE TO RELATED APPLICATION

This application is based on and claims priority from Korean Patent Application No. 10-2005-0044595 filed on May 26, 2005 in the Korean Intellectual Property Office, the disclosure of which is incorporated herein in its entirety by reference.

BACKGROUND OF THE INVENTION

1. Field of the Invention

The present invention relates to an apparatus and a method for providing additional information using an extension subtitles file, and more particularly, to an apparatus and a method for providing additional information using an extension subtitles file that can provide a user with additional information by adding additional information on images and subtitles to a synchronized subtitles file.

2. Description of the Related Art

The synchronized accessible media interchange technology (SAMI) of Microsoft Corporation and the real-text technology of RealNetworks, Inc. are conventional text-based captioning technologies. The conventional text-based captioning technologies have a structure of displaying captions based on synchronous time information of video stream data provided on a file in which the video stream data is recorded or via a network.

FIG. 1 shows a general caption file employing the SAMI format and parsed caption information. SAMI are advantageous as they are easy to produce and convenient to handle.

As illustrated, the method involves a SAMI file consisting of caption language in the extensible markup language (XML) format, and a parser to interpret the language. The caption language includes a time sync, caption content by language, and information on the size or color of a font, as necessary.

Operations to play text-based captions will be considered. Time sync (frame position) and text (speech) are extracted from a caption file by an internal XML parser read out by a caption processing unit and are stored in a memory. Caption text in a concerned frame position is checked, synchronized with image data, and then displayed when images are displayed on a frame basis.

For example, an XML parser extracts information about an English word "one" or a French word "un" located at time sync "1000", and an English word "two" or a French word "deux" located at time sync "2000" from the caption file. Next, the XML parser synchronizes and displays the parsed data with the image data at the concerned time sync.

FIG. 2 shows a screen displaying image data and caption text synchronized by processing a conventional caption language.

Referring to FIG. 2, a device to play text-based captions displays caption data on a predetermined space of the screen for a predetermined time while playing videos after having read the video stream data and caption data.

However, it is difficult for the conventional caption language to represent information other than captions (for example, additional information on a caption) because it only includes an extremely small part of an HTML tag. Also, the conventional caption language is limited in the variety of additional information it can provide because only a script format is displayed providing information to a user.

Korean Unexamined Patent Publication No. 2004-033766 (Servicing Method of Summaries and Value Added Information on Videos Using Video Metadata on Internet) discloses a method comprising storing a variety of additional information on places, music, characters or goods included in a video in video metadata, together with a key frame (representative image) summarizing the content of the video, automatically synchronizing the variety of additional information stored in the video metadata with a video play time when the video is played, thereby displaying additional information corresponding to the video play time. However, this method is directed to playing a video and a variety of additional information contained in the video at the same time when the video on demand (VOD) service is provided over the Internet, and it does not disclose a technology for displaying predetermined additional information that is included in a general SAMI file.

SUMMARY OF THE INVENTION

An aspect of the present invention provides more additional information to a user by adding additional information on images and captions to a synchronous caption file and displaying the added additional information after synchronizing it with image data and caption data.

Another aspect of the present invention is to propose flexible extension of a synchronous caption language through an additional information processing unit to process additional information data included in an extensible caption file.

This and other aspects, features and advantages of the present invention will become apparent to those skilled in the art from the following disclosure.

According to an aspect of the present invention, there is provided an apparatus of providing additional information by using an extension subtitle file comprising an inverse multiplexing unit to separate video and audio data from a multimedia file input by a data input unit, an XML parser to parse a caption data file and an additional information data file input by the data input unit, video and audio data processing units to decode the video and audio data input by the inverse multiplexing unit, and convert the decoded video and audio data into predetermined video and audio signals, a caption processing unit to process the caption data parsed and input by the XML parser, an additional information data processing unit to process the additional information data file parsed and input by the XML parser, and to generate user interface information based on the processed additional information, and a data output unit to display the processed video, audio, caption and user interface information.

According to another aspect of the present invention, there is provided a method of providing additional information by using an extension subtitle file comprising parsing caption data and additional information data input from an apparatus into which multimedia data, the caption data and the additional information data are input, generating user interface information by processing the parsed additional information data, and displaying the multimedia data, the caption data and the user interface information synchronously.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
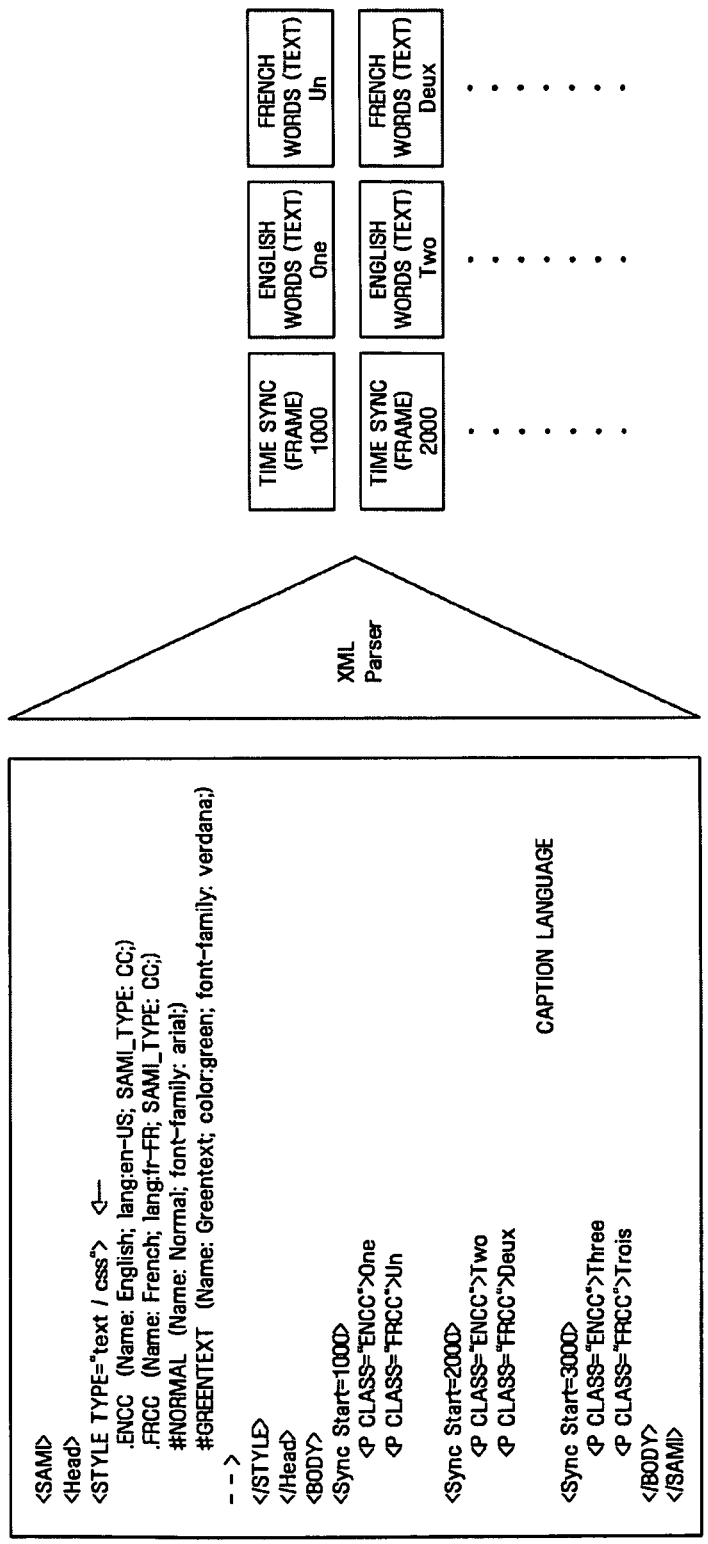
FIG. 1 shows a general caption file employing the SAMI format and parsed caption information.
Figure 2:
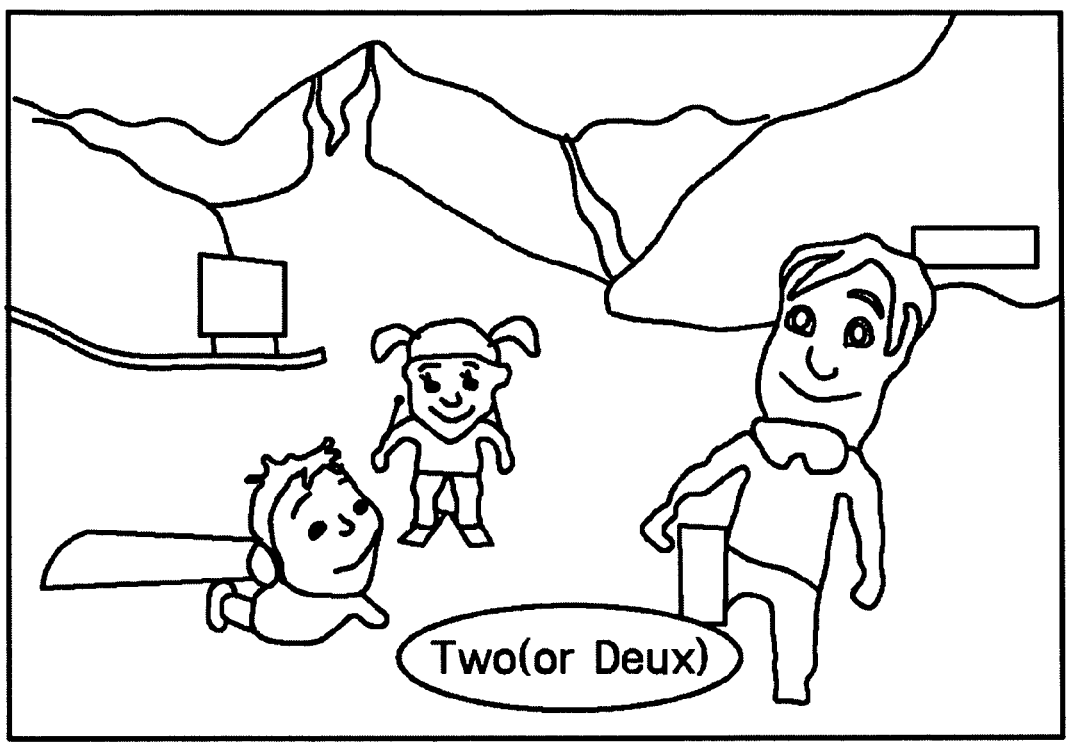
FIG. 2 shows a screen displaying image data and caption text synchronized by processing a conventional caption language.

The present invention will now be described more fully with reference to the accompanying drawings, in which exemplary embodiments of this invention are shown.

Advantages and features of the present invention and methods of accomplishing the same may be understood more readily by reference to the following detailed description of the preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 3:
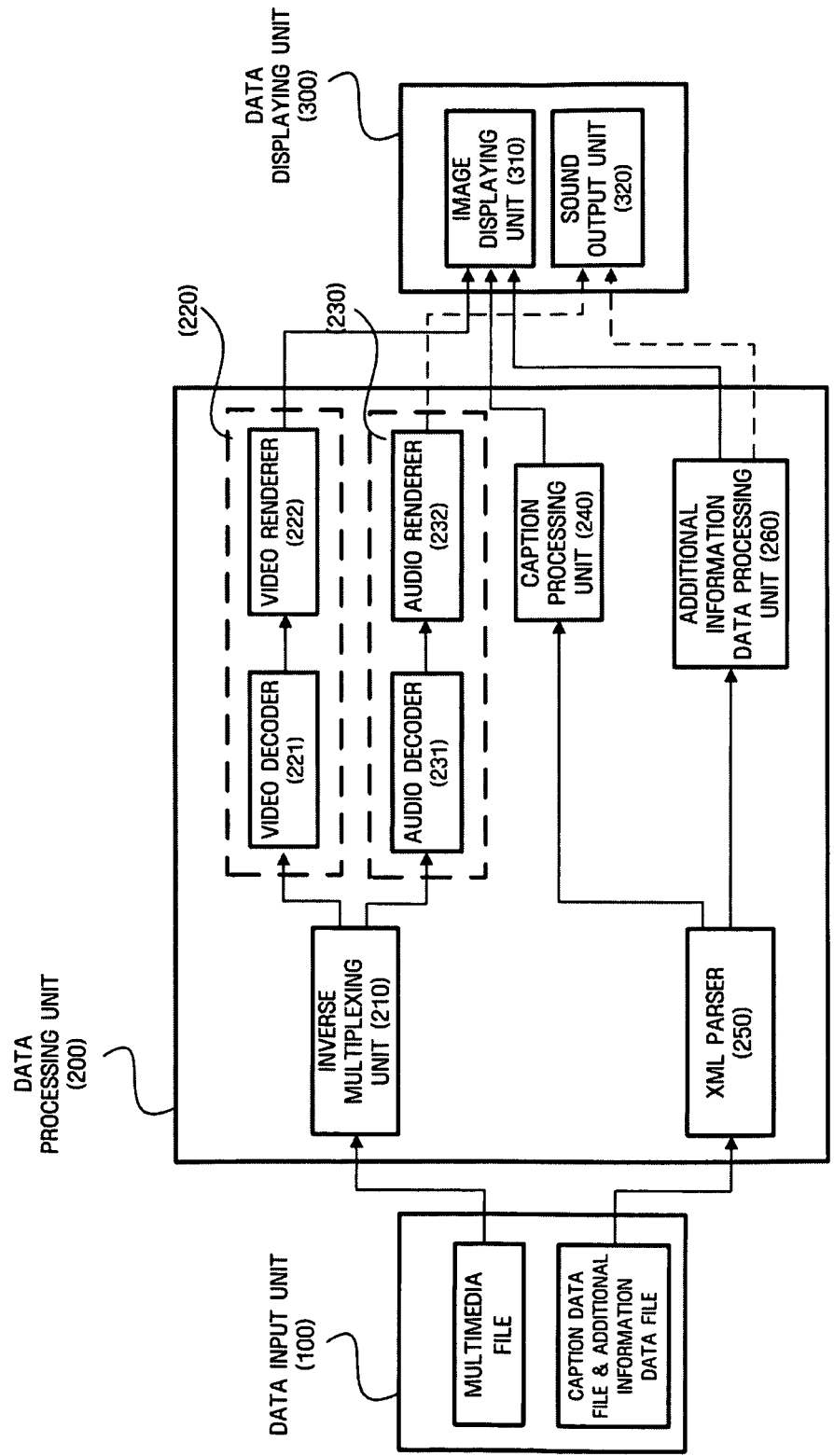
FIG. 3 is a block diagram showing an apparatus that provides additional information using an extensible caption file according to an exemplary embodiment of the present invention.

FIG. 3 is a block diagram showing an apparatus that provides additional information using an extensible caption file according to an exemplary embodiment of the present invention; the apparatus may be a media player.

Referring to FIG. 3, the apparatus consists of a data input unit 100, a data processing unit 200, and a data output unit 300. Here, the extensible caption file comprises a time sync to indicate a frame position, caption content by language, information on font size or color of captions as necessary, and additional information on images and captions.

The data input unit 100 inputs a multimedia file (video and audio data), a caption data file, and an additional information data file. The data processing unit 200 comprises an inverse multiplexing unit 210, a video data processing unit 220, an audio data processing unit 230, a caption processing unit 240, an XML parser 250, and an additional information data processing unit 260. The data displaying unit 300 comprises video display unit 310 and an audio output unit 320.

The inverse multiplexing unit 210 separates video and audio data from a multimedia file input via the data input unit 100 and sends the separated video and audio data to the image data processing unit 220 and the audio data processing unit 230.

The video data processing unit 220 comprises a video decoder 221 to decode video data input from the inverse multiplexing unit 210, and a video renderer 222 to process the decoded video data input to the video decoder 221 and convert it to a predetermined video signal.

The audio data processing unit 230 comprises an audio decoder 231 to decode audio data input from the inverse multiplexing unit 210, and an audio renderer 232 to process the decoded audio data and convert it to a predetermined audio signal.

The XML parser 250 parses an XML document (i.e. caption data and additional information data) input from the data input unit 100, and sends the parsed caption data and additional information data to the caption processing unit 240 and the additional information data processing unit 260.

The caption processing unit 240 processes the parsed caption data. When video is displayed on a frame basis, the caption processing unit 240 checks the caption data corresponding to a concerned frame position and displays it with synchronized audio data.

The additional information data processing unit 260 processes additional information data parsed by the XML parser 250, and then generates user interface information to be provided via the screen based on the processed additional information. Here, the additional information data refers to information on videos and captions, and comprises information such as types, words and expressions of characters, display time, audio sources, and link URLs according to time syncs. It should be noted that user interface information refers to a character with a predetermined shape that represents additional information on caption and audio. That is, a synchronized character is displayed in a predetermined frame position where videos and captions are displayed, and an additional explanation about the concerned video and caption is provided in caption and audio form.

The video display unit 310 displays videos, captions, and user interface information transmitted by the video processing unit 220, the caption processing unit 240, and the additional information data processing unit 260 according to information on the frame position (i.e., time sync information).

The video display unit 310 sets priority values for video data, caption text, and user interface information and then locates them (i.e. video data, caption text, and user interface information) in respective layers of the screen according to the set priority values.

For example, the video display unit 310 sets the priorities for user interface information, caption and video in order. Accordingly, the video display unit 310 displays video data having the lowest priority in the lowest layer of the screen, caption text in the next layer following the video data, and user interface information in the highest layer of the screen, so that the displayed additional information (e.g., a character) may be not overlapped by video data and caption text.

The audio output unit 320 outputs audio information transmitted by the audio processing unit 230 and the additional information data processing unit 260 after synchronizing it with the video.

The additional information providing apparatus provides time stamps that detail time fields in the unit of microseconds (μsec), in order that data (i.e., user interface information, captions, video and audio) processed by the video data processing unit 220, the audio data processing unit 230, the caption processing unit 240, and the additional information data processing unit 260 are synchronized (i.e., displayed according to the set time sync). The time stamps may reside in the data displaying unit 300.

Figure 4:
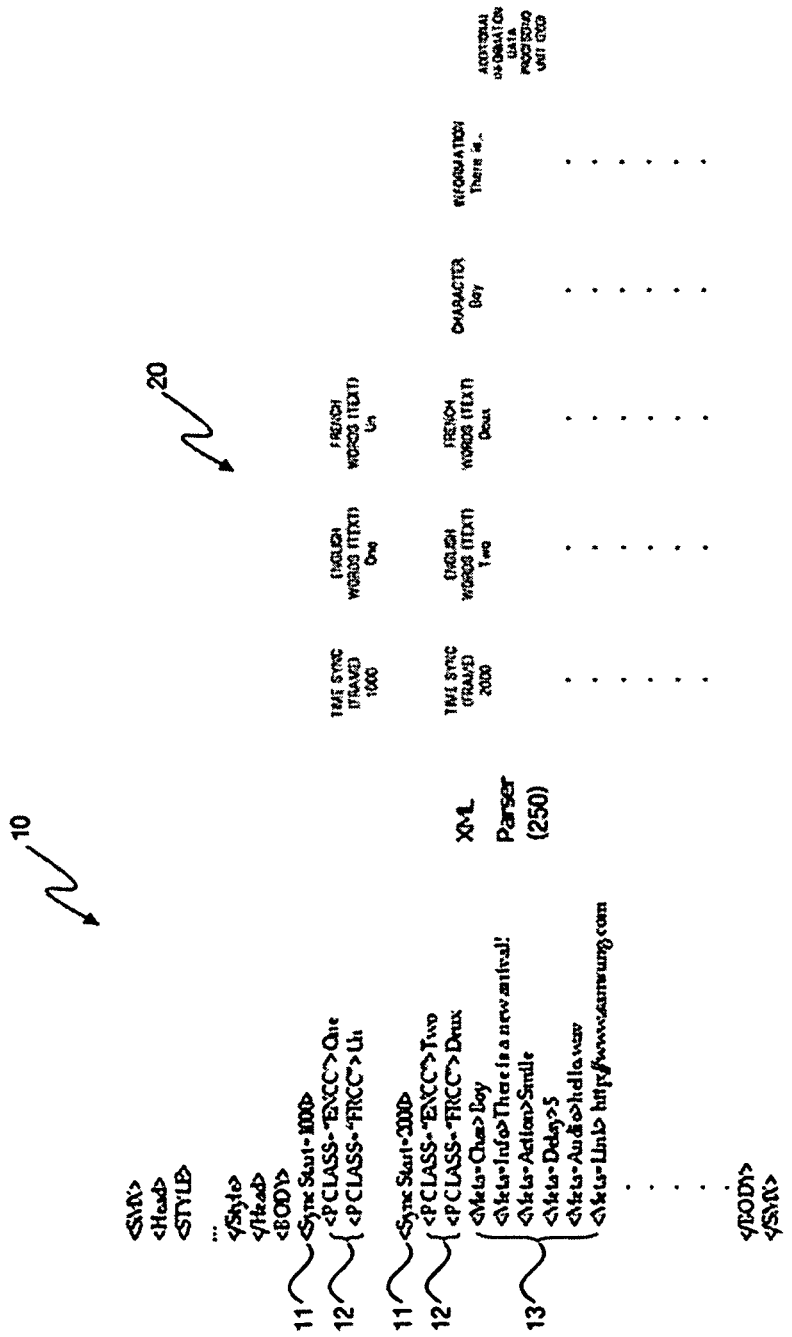
FIG. 4 shows an extensible caption file, parsed caption information and additional information according to another exemplary embodiment of the present invention.

FIG. 4 shows an extensible caption file, information and additional information on a parsed caption according to an exemplary embodiment of the present invention.

Referring to FIG. 4, the extensible caption file 10 comprises a time sync 11 to indicate a frame position, caption content by language 12, and additional information on videos and captions 13.

When the time sync is "1000," caption information 12 displayed on a screen (i.e., the English word "one" or the French word "un") is recorded in the extensible caption file 10.

When the time sync is "2000," caption information 12 (e.g., the English word "two" or the French word "deux"), additional information 13 (e.g., character information such as boy, caption information about the character "There is a new arrival", expression information on the character, time information when the character disappears from a screen (5 seconds), audio information "Hello" of the character, and information linked to the character http://www.samsung.com) are recorded in the extensible caption file 10.

A process of parsing an extensible caption file will be described. When the extensible caption file 10 is input by the data input unit 100, the XML parser 250 parses the input extensible caption file 10. That is, the XML parser 250 separates caption data and additional information data from the extensible caption file 10 and interprets them, and then sends the interpreted information 20 to the caption processing unit 240 and the additional information data processing unit 260.

The additional information data processing unit 260 generates user interface information by processing additional information input by the XML parser 250, and then sends the generated user interface information (e.g., a character) to the video display unit 310 in order to display it on the screen.

The character to explain additional information appears together with video and captions in the concerned frame position, thereby providing more information to a user.

Figure 5:
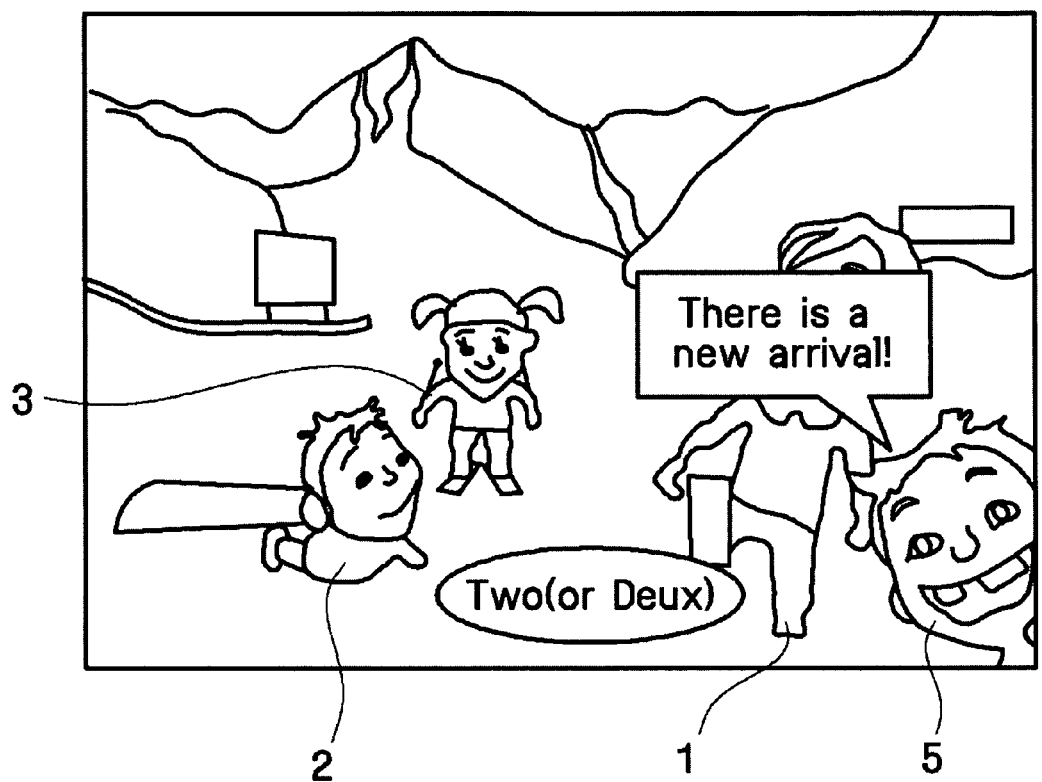
FIG. 5 shows a screen displayed via the apparatus that provides additional information using an extensible caption file according to another exemplary embodiment of the present invention.

FIG. 5 shows a screen displayed through additional information providing apparatus using an extensible caption file according to another exemplary embodiment of the present invention.

The XML parser 250 parses a caption file input from the data input unit 100, extracts a time sync (i.e., a frame position), text data, and additional information data, and then sends them to the caption processing unit 240 and the additional information data processing unit 260. The additional information data processing unit 260 generates user interface information (i.e., a character) based on the parsed additional information. The character generated based on the additional information includes character information (e.g., gender and expression), caption information, audio information of the character, and link information.

When video is displayed on a frame basis, the caption processing unit 240 checks caption text on the concerned frame position, and then displays it synchronously with video data. The additional information data processing unit 260 checks user interface information on the concerned frame position, and then displays it synchronously with video and caption text.

Referring to FIG. 5, basic images (e.g., characters 1, 2, and 3) are displayed on a screen, a caption (i.e., "two or deux") allocated to a basic image (i.e., character 1) and audio corresponding thereto are displayed synchronously with the video.

At the same time, a character 5 explaining additional information is overlapped on the basic video and caption text. A caption ("There is a new arrival") and audio ("Hello") allocated to the character 5 are displayed synchronously with the character 5. Here, the character 5 has a smiling face according to the information recorded in the extensible caption file 10, and it is also set so the face will automatically disappear after five seconds. Because the character 5 has link information associated with a predetermined site, a user may be directed into the concerned site when the user selects the character 5.

Figure 6:
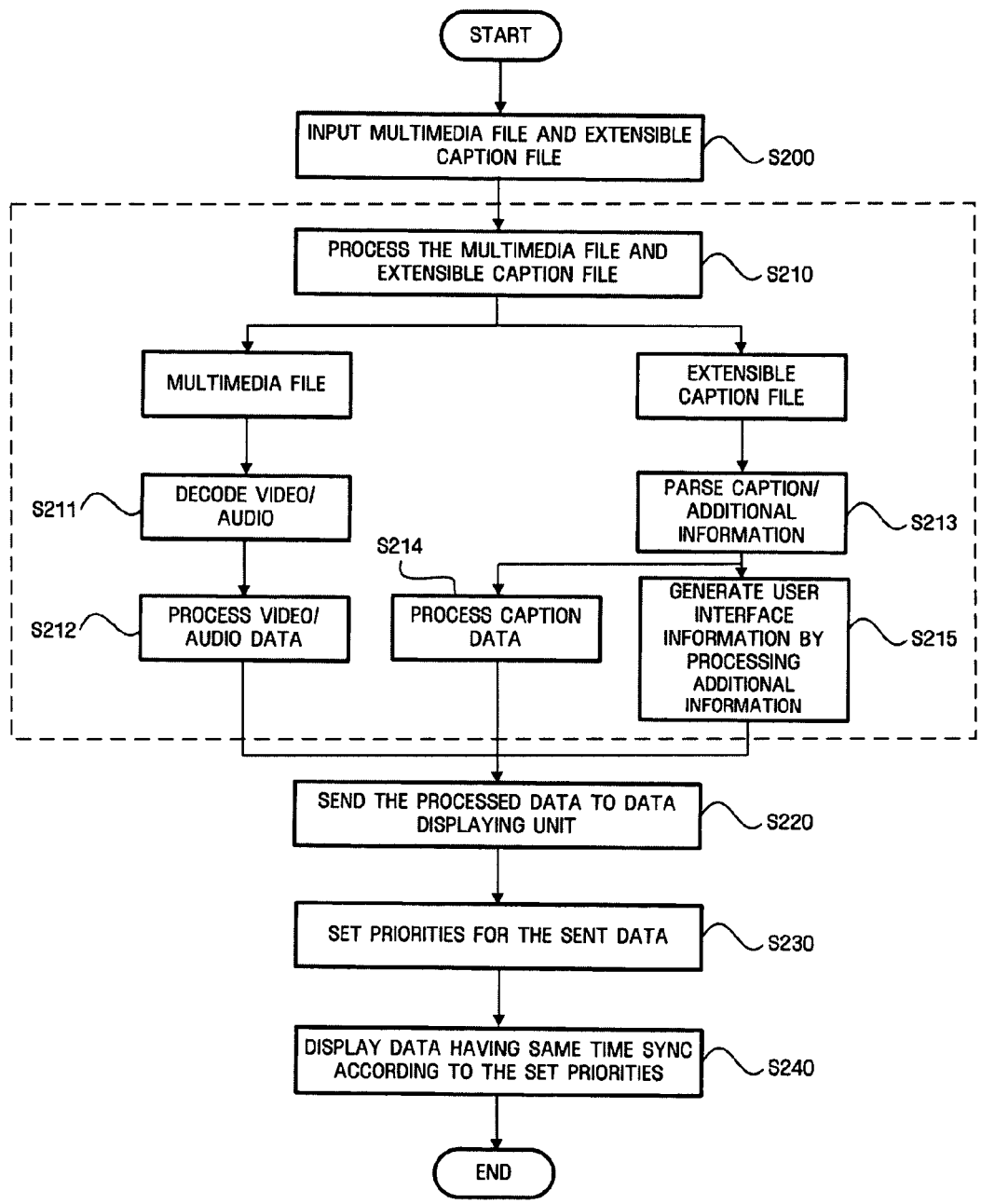
FIG. 6 is a flowchart illustrating a method providing additional information using an extensible caption file according to another exemplary embodiment of the present invention.

FIG. 6 is a flowchart illustrating an additional information providing method using an extensible caption file according to another exemplary embodiment of the present invention.

When a multimedia file and an extensible caption file are input through the data input unit 100 (S200), the input multimedia file is separated into video and audio data by the inverse multiplexing unit 210, and caption data and additional information data is extracted by the XML parser 250 (S210). Here, the extensible subtitle file includes a time sync indicating a frame position, caption content by language, font size or color of the caption to be displayed as necessary, and further additional information on the video and caption.

The video separated data is input into the video processing unit 220 and decoded by the video decoder 221 (S211). The video renderer 222 converts the decoded video data into a predetermined video signal. The audio data is input into the audio processing unit 230 and decoded by the audio decoder 231. The audio renderer 232 converts the decoded audio data into a predetermined audio signal (S212).

The caption data extracted by the XML parser 250 is input into the caption processing unit 240 and parsed (S213) and processed (S214), and the parsed additional information data is input into the additional information data processing unit 260 and processed (S215).

The additional information processing unit 260 generates user interface information by processing the parsed additional information data. It should be noted that the user interface information refers to a character to additionally explain video and captions based on the input additional information data. The character can be, for example, words, an expression, a time, audio, or a URL link.

When the processed data (user interface information, caption data, and video and audio data) is transmitted to the data display unit 300 (S220), the video display unit 310 of the data output unit 300 sets the priorities for the user interface information, caption data, and video data (S230). The priority refers to the order used to present the user interface information, caption data and video data on the screen. Here, the higher priority data is placed in a higher layer of the screen.

For example, the video display unit 310 prioritizes the user interface information, so that it is positioned in a higher layer of the screen when the user interface information is displayed.

Videos, captions, and user interface information (i.e., a character) corresponding to the same time sync are displayed on the screen through a time stamp (S240). This data is displayed on the screen according to the set priority. For example, the user interface information has first priority, and it is followed in priority by the captions and video, and therefore the user interface information (i.e., character) is located in the uppermost layer of the screen.

Accordingly, the character which provides videos, captions and additional information are synchronously displayed on the screen. Also, the concerned audio is synchronously output through a predetermined audio output device. The character may provide additional information on the video and captions in the form of captions and/or predetermined audio. Because the character has link information associated with a predetermined site, a user may be directed to the concerned site when he/she selects the character.

Accordingly, when the user watches a predetermined video, additional information may be provided to the user because it can be synchronously provided.

As described above, the apparatus and the method for providing additional information using an extensible caption file according to the present invention produce one or more of the effects described below.

Additional information on the video and captions is added to a general synchronous caption file and this information is synchronously provided to the user.

Additional information on video and captions is added to a general synchronous caption file, thereby providing a flexible extension of the caption language and a variety of user interfaces.

Although the apparatus and method for managing a file system according to the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. An apparatus for providing additional information using an extensible caption file, the apparatus comprising:
   a data input unit to receive a multimedia file, a caption data file and an additional information data file as separate files;
   an inverse multiplexing unit to separate video and audio data from the multimedia data file;
   an XML parser to parse the caption data file and the additional information data file;
   video and audio data processing units to decode the video and audio data input from the inverse multiplexing unit, and convert the decoded video and audio data into processed video and audio information;
   a caption processing unit to process the caption data file parsed and input by the XML parser to generate processed caption information;
   an additional information data processing unit to process the additional information data file parsed and input by the XML parser, and to generate user interface information based on the processed additional information data file; and
   a data output unit to display the processed video, audio, caption and user interface information,
   wherein the user interface information is located in a layer upper than layers in which the caption and the video are located when the user interface information is displayed, and
   wherein the user interface information comprises a non-text type object.

2. The apparatus of claim 1, wherein the data output unit sets priority values for the video, the caption, and the user interface information and locates them in respective layers of the screen according to the set priority values, and
   wherein the user interface information has first priority.

3. The apparatus of claim 1, wherein the additional information data file includes video, audio and caption information.

4. The apparatus of claim 1, wherein the character information comprises gender and expression information.

5. The apparatus of claim 1, wherein the additional information data file comprises information linked to a predetermined website.

6. The apparatus of claim 1, wherein the user interface information is a character with a predetermined shape that represents additional information on the caption information and the audio information.

7. A method of providing additional information using an extensible caption file, the method comprising:
   receiving a multimedia file, a caption data file and an additional information data file as separate files;
   parsing the caption data file and the additional information data file input;
   generating user interface information by processing the parsed additional information data file; and
   displaying the multimedia data, the caption data and the user interface information synchronously,
   wherein the user interface information is located in a layer upper than layers in which the caption and the video are located when the user interface information is displayed, and
   wherein the user interface information comprises a non-text type object.

8. The method of claim 7 further comprising:
   setting priorities for the multimedia data, the caption data file and the user interface information; and
   displaying them based on the set priority, and
   wherein the user interface information has first priority.

9. The method of claim 7, wherein the user interface information comprises video, audio and caption information.

10. The method of claim 7, wherein the additional information overlaps the multimedia data and the caption data.

11. The method of claim 7, wherein the additional information data file comprises information linked to a predetermined website.

12. The method of claim 7, wherein the user interface information is a character with a predetermined shape that represents additional information on the caption information and the audio information.

13. An apparatus, comprising:
   a data input unit to receive a multimedia file, a caption data file and an additional information data file as separate files;
   a caption processing unit configured to process caption information;
   an additional data processing unit configured to process the additional information data file and to generate user interface information based on the additional information data file; and
   a data output unit configured to combine for display multimedia information of the multimedia data, the caption information, and the user interface information,
   wherein the user interface information is located in a layer upper than layers in which the caption and the video are located when the user interface information is displayed, and
   wherein the user interface information comprises a non-text type object.

14. The apparatus of claim 13, further comprising an XML parser configured to parse a caption data file to provide the caption information, and to parse an additional information file to provide the additional data.

15. The apparatus of claim 14, further comprising:
   an inverse multiplexing unit configured to separate video and audio data from the multimedia data; and
   video and audio processing units configured to decode, respectively, the video and audio data separated from the multimedia data and to generate video and audio information, wherein the video and audio information is the multimedia information of the multimedia data.

16. The apparatus of claim 13, wherein the data output unit sets priority values for the video, the caption, and the user interface information and locates them in respective layers of the screen according to the set priority values, and
   wherein the user interface information has first priority.

17. The apparatus of claim 13, wherein the additional information data file comprises information linked to a predetermined website.

18. The apparatus of claim 13, wherein the user interface information is a character with a predetermined shape that represents additional information on the caption information and the audio information.

* * * * *